United States Patent
Lee et al.

(10) Patent No.: US 8,805,190 B2
(45) Date of Patent: Aug. 12, 2014

(54) VISIBLE LIGHT WIRELESS COMMUNICATION METHOD AND SYSTEM

(75) Inventors: Kyung-woo Lee, Yongin-si (KR);
Dae-Kwang Jung, Suwon-si (KR);
Dominic O'Brien, Oxford (GB)

(73) Assignees: Samsung Electronics Co., Ltd. (KR);
The Chancellor, Masters and Scholars of the University of Oxford (GB)

( * ) Notice: Subject to any disclaimer, the term of this patent is extended or adjusted under 35 U.S.C. 154(b) by 380 days.

(21) Appl. No.: 13/002,240

(22) PCT Filed: Jul. 2, 2009

(86) PCT No.: PCT/KR2009/003631
§ 371 (c)(1),
(2), (4) Date: Dec. 30, 2010

(87) PCT Pub. No.: WO2010/002212
PCT Pub. Date: Jan. 7, 2010

(65) Prior Publication Data
US 2011/0110668 A1    May 12, 2011

(30) Foreign Application Priority Data
Jul. 2, 2008    (KR) .................. 10-2008-0064122

(51) Int. Cl.
*H04B 10/00*    (2013.01)
(52) U.S. Cl.
USPC .................. 398/118; 398/124; 398/130

(58) Field of Classification Search
USPC .................................. 398/118–131
See application file for complete search history.

(56) References Cited

U.S. PATENT DOCUMENTS

| | | | |
|---|---|---|---|
| 2001/0007505 A1* | 7/2001 | Lee et al. | 358/500 |
| 2004/0000919 A1* | 1/2004 | Gupta et al. | 324/693 |
| 2006/0067707 A1* | 3/2006 | Maniam et al. | 398/183 |
| 2006/0079199 A1 | 4/2006 | Thompson | |
| 2007/0058987 A1 | 3/2007 | Suzuki | |
| 2008/0298811 A1* | 12/2008 | Son et al. | 398/172 |
| 2009/0208221 A1* | 8/2009 | Sasai | 398/130 |
| 2009/0217425 A1* | 8/2009 | Maeda | 850/1 |

FOREIGN PATENT DOCUMENTS

| | | |
|---|---|---|
| DE | 102006024421 | 10/2007 |
| JP | 2003-318836 | 11/2003 |
| JP | 2004297425 | 10/2004 |
| JP | 2006319545 | 11/2006 |
| JP | 2007081703 | 3/2007 |

OTHER PUBLICATIONS

PCT/ISA/237 Written Opinion issued on PCT/KR2009/003631 (12 pp.)

* cited by examiner

*Primary Examiner* — Dzung Tran
(74) *Attorney, Agent, or Firm* — The Farrell Law Firm, P.C.

(57) ABSTRACT

A visible-light wireless communication system includes a plurality of light transmitters for generating light signals modulated at different frequencies and at least one terminal for wirelessly communicating with the plurality of light transmitters using the light signals.

9 Claims, 3 Drawing Sheets

VISIBLE LIGHT WIRELESS COMMUNICATION METHOD AND SYSTEM

TECHNICAL FIELD

The present invention relates generally to an optical wireless communication system, and in particular, to a visible-light wireless communication system including light emitting diodes (LEDs).

BACKGROUND ART

An optical wireless communication system wirelessly transmits a light signal generated from a light transmitter to a terminal at the other side. In this system, a light source capable of creating light in a near infrared wavelength band or a white LED capable of creating white light may be used as the light transmitter.

The above-described white LED may also provide lighting features by using white light for data modulation. A white light source made by a combination of LEDs of the three primary colors or an LED in which yellow phosphor is coated on an active layer capable of generating blue light can be used as the light transmitter.

As compared to the light transmitter made by the LEDs of the three primary colors, the white LED in which the yellow phosphor is coated on the active layer capable of generating the blue light may be manufactured cost-effectively and therefore used widely.

However, since the above-described white light source (the white LED in which the yellow phosphor is coated on the active layer capable of generating the blue light) has a slow decay rate to an impulse response of the yellow phosphor, there is a problem in that an available frequency band is narrowed.

FIG. 1 is a graph illustrating the wavelength spectrum of a conventional white LED. Referring to FIG. 1, blue wavelength light has a wavelength bandwidth of about 25 nm at the center of 440 nm (where a transmission coefficient is 0.4) and yellow wavelength light generated from yellow phosphor has a wavelength bandwidth of about 50 nm at the center of 550 nm (where the transmission coefficient is 0.4). It can be seen that the yellow wavelength light has a wavelength bandwidth at least twice as wide as the blue wavelength light.

FIG. 2 is a graph illustrating response characteristics with respect to frequencies of yellow light and white light generated from a white LED. In FIG. 2, the x-axis represents a frequency band (Hz) of a generated light signal and the y-axis represents a gain (dB). Referring to FIG. 2, the bandwidth of blue wavelength light generated from an active layer among lights constituting the white light output from the white LED is 13 MHz and the bandwidth of yellow light generated from a fluorescent material is 2.3 MHz. In the graph of FIG. 2, the dotted line indicates a response of blue wavelength light and the solid line indicates a response of white wavelength light.

DISCLOSURE OF INVENTION

Technical Problem

The above-described bandwidth and wavelength characteristics of the white LED may be factors limiting an available frequency band in visible-light communication. That is, the yellow light has a light-emitting characteristic of a slow change which is more time-consuming than that of the blue light. Accordingly, there is a problem in that a frequency bandwidth of the yellow light capable of being modulated and transmitted is less than that of the blue light.

Technical Solution

An aspect of the present invention is to address at least the problems and/or disadvantages and to provide at least the advantages described below. Accordingly, an aspect of the present invention is to provide a visible-light wireless communication system and method capable of using a wide frequency band for wireless communication.

According to a first aspect of the present invention, there is provided a visible-light wireless communication system including: a plurality of light transmitters for generating light signals modulated at different frequencies; and at least one terminal for wirelessly communicating with the plurality of light transmitters using the light signals.

According to a second aspect of the present invention, there is provided a visible-light wireless communication method, including: generating a plurality of light signals modulated in different frequency bands; and combining and transmitting the plurality of light signals.

Advantageous Effects

In FIG. 8, the conventional technology including only one light transmitter is compared to the inventive technology including two or three light transmitters capable of generating light signals modulated at different frequencies. In FIG. 8, eye diagrams are compared at 5 Mbps, 10 Mbps, 20 Mbps, 30 Mbps, and 40 Mbps.

Referring to FIG. 8, when one light transmitter according to the conventional technology is included, it is in an unavailable state since the eye is closed in cases other than 5 Mbps. On the other hand, when two light transmitters capable of generating light signals modulated at different frequencies are included, it can be seen that the eye diagram is maintained from 10 Mbps to 30 Mbps, but the eye is closed from 40 Mbps.

When referring to another example of the present invention including three light transmitters capable of generating light signals modulated at different frequencies, it can be seen that the eye diagram is maintained from 10 Mbps to 40 Mbps.

From FIG. 8, it can be seen that transmission data capacity increases in a visible-light wireless communication system having a plurality of light transmitters capable of generating different frequencies according to an exemplary embodiment of the present invention.

BEST MODE FOR CARRYING OUT THE INVENTION

According to an exemplary embodiment of the present invention, a visible-light wireless communication system includes at least one terminal for visible-light wireless communication and a plurality of light transmitters capable of generating light signals modulated at different frequencies. The light transmitters may include white LEDs capable of modulating the light signals at the different frequencies.

Figure 1:
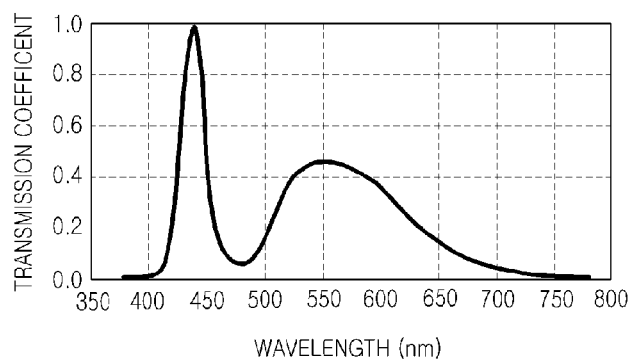
FIG. 1 is a graph illustrating light-emitting characteristics of a white LED.
Figure 2:
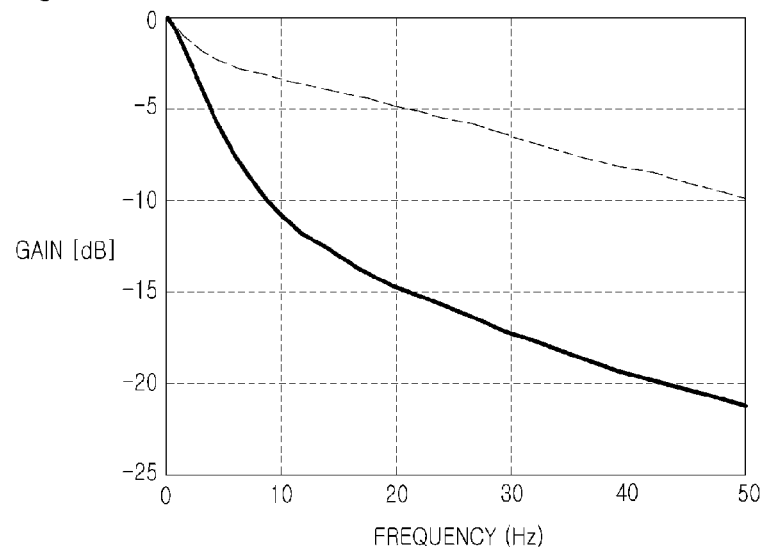
FIG. 2 is a graph illustrating response characteristics of the white LED.
Figure 3:
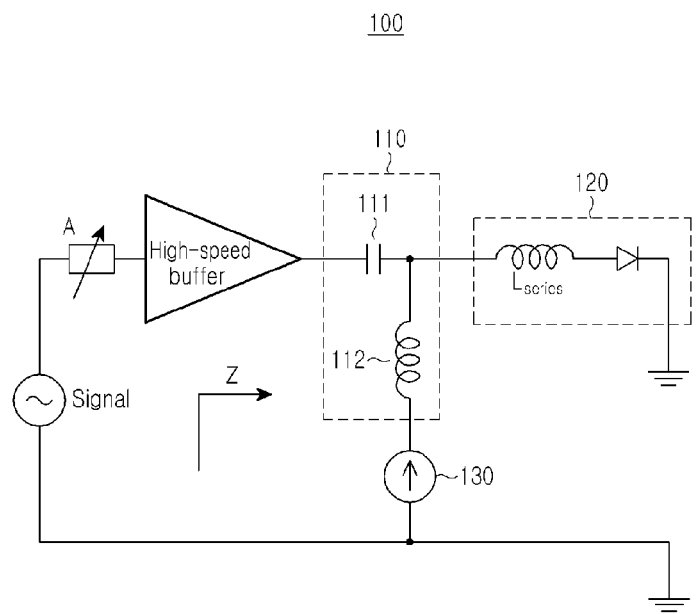
FIG. 3 is a schematic diagram illustrating a structure of a light transmitter according to an exemplary embodiment of the present invention.

FIG. 3 is a schematic diagram illustrating a structure of a light transmitter according to an exemplary embodiment of the present invention. Referring to FIG. 3, a light transmitter 100 of a visible-light wireless communication system according to an exemplary embodiment of the present invention includes a light source 120 capable of generating white light and a frequency converter 110 for frequency modulation of the light source 120.

The light transmitter 100 can further include a port (Signal) for receiving a signal input from an outside source, a high-speed buffer, and a circuit 130 for interrupting an alternating current (AC) component and a direct current (DC) component.

A white LED in which phosphor capable of emitting yellow wavelength light is coated on an active layer capable of generating blue wavelength light can be used as the light source 120. A frequency of a light signal to be modulated can be controlled by the frequency converter 110. The above-described white LED can be applied in the form where phosphor capable of emitting yellow wavelength light is coated on an active layer capable of generating green or red wavelength light or in the form where phosphor capable of emitting green, red, or blue wavelength light is coated on an active layer capable of generating yellow wavelength light.

The frequency converter 110 includes a capacitor 111 for frequency modulation of the light source 120 and a DC arm 112 arranged between the capacitor 111 and the light source 120. The frequency converter 110 can convert a frequency of a light signal to be modulated in the light source 120 according to a capacitance of the capacitor 111.

The light source 120 has a unique inductance value $L_{series}$ and cannot perform frequency conversion. However, in spite of the unique inductance value, the light source 120 can generate a frequency-converted light signal when a capacitance value is artificially changed by an outside source.

The following Equation (1) expresses an impedance value of a conventional electronic device.

$$Z(\omega) = R + j\omega L_{series} + \frac{1}{j\omega C} - \frac{(1-\omega^2 L_{series}C) \cdot j\omega RC}{j\omega C} \quad \text{Equation (1)}$$

In Equation (1), Z(w) denotes the input impedance of the circuit illustrated in FIG. 3, R denotes the resistance, and $L_{series}$ denotes the impedance of the light source. Additionally, C denotes the capacitance of the frequency converter. In the above-described Equation (1), $j\omega L_{series}$ denotes the inductance, 1/jwLC denotes the capacitive reactance, and w denotes 2 pf.

The following Equation (2) can be derived from the above-described Equation (1). The relationship of the frequency, the capacitance, and the inductance can be found from the following Equation (2).

$$f_i = \frac{1}{2\pi\sqrt{L_{series}C}} \quad \text{Equation (2)}$$

In Equation (2), $f_i$ denotes a frequency of a light signal generated from one of a plurality of light transmitters 100 and $C_i$ denotes a capacitance value of the capacitor 111 included in one of the plurality of light transmitter 100.

From the above-described Equation (2), it can be seen that a frequency of a light signal to be modulated in the light source 120 is determined according to the capacitance of the capacitor 111. According to an exemplary embodiment of the present invention, a visible-light wireless communication system including the plurality of light transmitters 100 capable of generating light signals modulated at different frequencies can be implemented.

Figure 4:
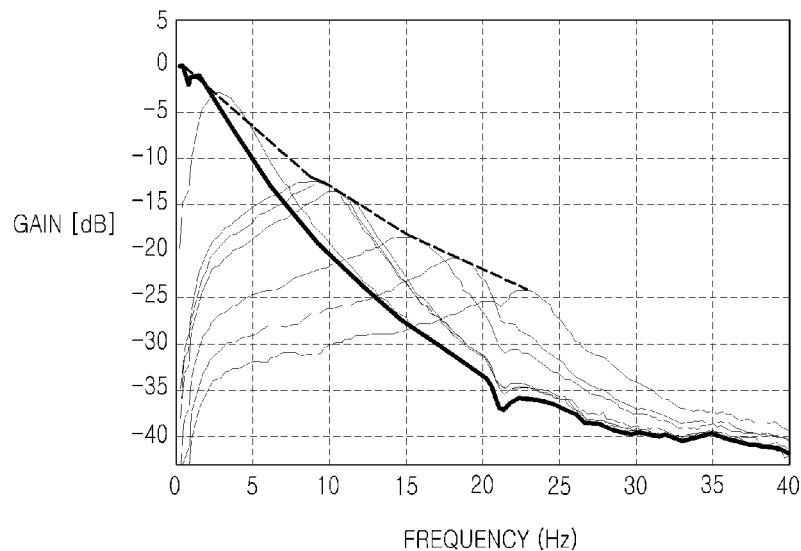
FIG. 4 is a graph illustrating operation characteristics of a visible-light communication system according to an exemplary embodiment of the present invention.

FIG. 4 is a graph illustrating operation characteristics of a visible-light communication system according to an exemplary embodiment of the present invention. In FIG. 4, the thin solid lines indicate light signals modulated at different frequencies, the thick solid line is a line combining the light signals, and the dashed line is a line connecting maximum values of frequency responses of the light signals.

FIG. 4 illustrates experimentation results when the same electric signal is applied to the light transmitters. From FIG. 4, it can be seen that a gain (or optical response) decreases as a frequency increases. The gain (or response characteristic) of a light signal modulated at a maximum frequency of about 2.5 MHz is about −2.5 dB, the gain (or response characteristic) of a light signal modulated at a maximum frequency of about 9 MHz is about −13 dB, and the gain (or response characteristic) of a light signal modulated at a maximum frequency of about 23 MHz is about −24 dB. It can be seen that the gain (or optical response) decreases as the frequency decreases.

Figure 5:
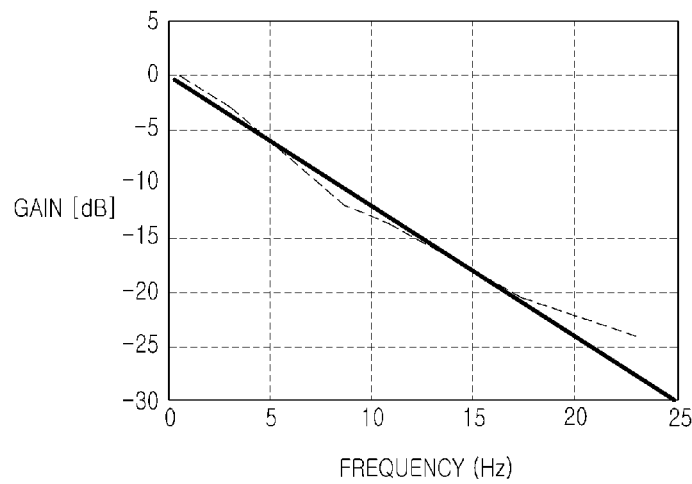
FIG. 5 is a graph obtained by approximating the graph of FIG. 4 in the form of exponential function.

FIG. 5 is a graph obtained by approximating the graph of FIG. 4 in the form of exponential function. The graph of FIG. 5 is an exponential graph obtained by measuring a light signal output from a light transmitter including a white LED as a light source.

The graph of FIG. 5 illustrates measurement results when the frequency is 3.6 MHz, and can be expressed by the following Equation (3).

$$H(\omega) = e^{\frac{-\omega}{\omega_{LED}}} \quad \text{Equation (3)}$$

In Equation (3), H(w) is a function in which a response characteristic according to a frequency has been approximated in the white LED, and $w_{LED}$ is the angular velocity ($f_{LED}=w_{LED}/2\pi$) of the white LED used for measurement.

Figure 6:
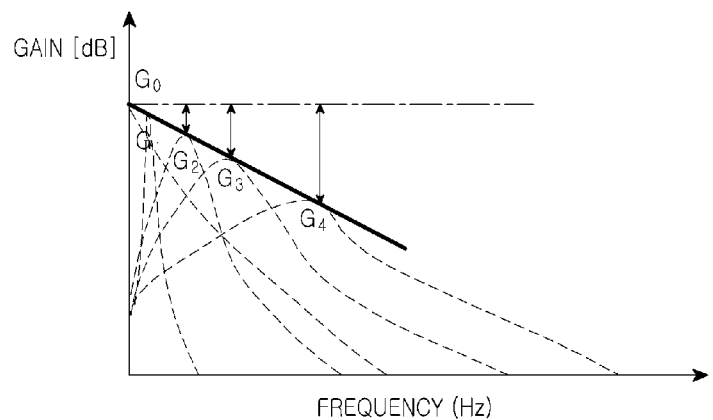
FIG. 6 is a graph illustrating gain compensation in a visible-light wireless communication system for generating light signals modulated at different frequencies according to an exemplary embodiment of the present invention.

FIG. 6 is a graph illustrating gain compensation in a visible-light wireless communication system for generating light signals modulated at different frequencies according to an exemplary embodiment of the present invention. Specifically, FIG. 6 is a graph illustrating a test of a visible-light wireless communication system including a plurality of light transmitters capable of generating light signals modulated at different frequencies.

FIG. 6 has the same form as FIG. 4, but is the graph illustrating the gain compensation of the visible-light wireless communication system according to the exemplary embodiment of the present invention. In FIG. 6, the dotted lines $G_1$, $G_2$, $G_3$, and $G_4$ of FIG. 6 are gain curves of the light transmitters that differ according to frequencies. As described with reference to FIG. 4, it can be seen that the gain decreases as the frequency increases.

The present invention relates to a visible-light wireless communication system that needs to make compensation so that light signals generated from light transmitters have regular gains for use in communication. In FIG. 6, the solid line is a curve connecting maximum gains of the light signals and the dotted-dashed line $G_0$ denotes a maximum gain for compensation. For the light transmitters including the white LEDs capable of generating the light signals modulated at the different frequencies, band flattening (pre-equalization) can be made by considering resonance frequency values, the number of resonance frequencies, and gain levels of the resonance frequencies.

The following Equation (4) shows the relationship of electro-optic efficiency varying with a drive current of the white LED.

$$G_i(\omega) = H_{LED}(\omega) \times I(\omega) \quad \text{Equation (4)}$$

In Equation (4), $G_i(w)$ is a gain function of one of the white LEDs, $H_{LED}(w)$ is an exponential function in which a response characteristic has been approximated according to a frequency in the white LED as described with reference to the above-described Equation (3), and $I(w)$ is a function of a drive current applied to a corresponding white LED. Assuming that a terminal at the other side operates in a linear section, a gain-flattened frequency response function can be computed as follows.

$$F(\omega) = \sum_{i=0}^{N} \alpha_i G_i(\omega) \quad \text{Equation (5)}$$

In Equation (5), $F(w)$ is a gain-flattened frequency response function and indicates a gain-compensated state as indicated by the dotted-dashed line of FIG. 6, $a_i$ is a constant for gain compensation as indicated by the arrow between the solid line and the dotted-dashed line of FIG. 6, and $G_i(w)$ is the same as the gain function of Equation (4).

That is, the visible-light wireless communication system according to an exemplary embodiment of the present invention can flatten gains as shown in Equation (5) so that light signals generated from the light transmitters (white LEDs) can have maximum gains.

Figure 7:
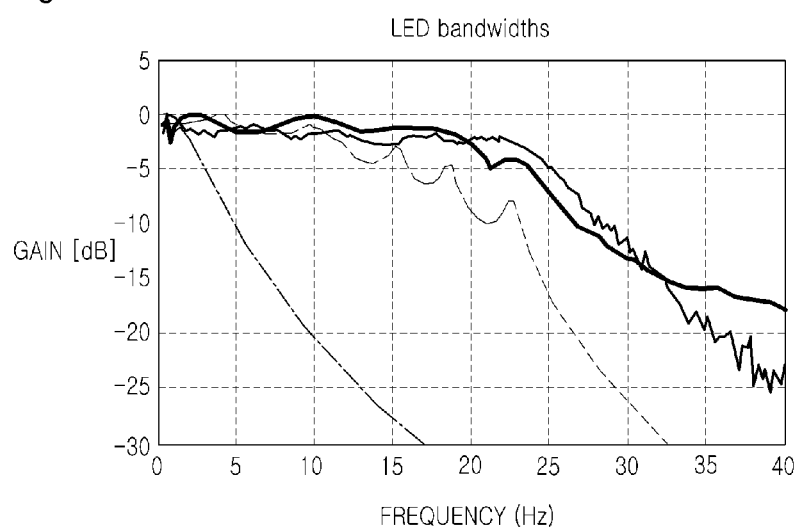
FIG. 7 is a graph for a comparison between theoretical and real values of a frequency response in the visible-light wireless communication system according to an exemplary embodiment of the present invention.
Figure 8:
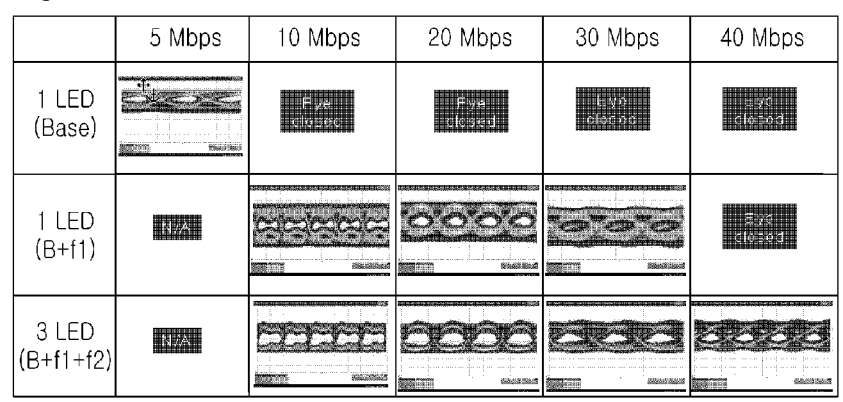
FIG. 8 is a diagram for a comparison between inventive and conventional visible-light wireless communication systems.

FIG. 7 is a graph for a comparison between theoretical and real values of a frequency response in the visible-light wireless communication system according to an exemplary embodiment of the present invention.

The graph arranged at the bottom of FIG. 7 is obtained by measuring only bandwidths of the white LEDs, the second bottom graph is computed by applying a theoretical model, the third bottom graph is obtained by computing a sum of responses of the white LEDs obtained from the graphs of FIG. 4, and the top graph is an actual measurement graph of band-flattened white LEDs measured actually. From FIG. 7, it can be seen that the theoretical model is substantially the same as actual data according to an exemplary embodiment of the present invention.

The invention claimed is:

1. A visible-light wireless communication system for visible-light communication with terminals, comprising:

a plurality of light transmitters for generating light signals modulated in different frequencies for wireless communication with the terminals, wherein the plurality of light transmitters each include a light source for outputting light and a frequency converter for frequency modulation of the light source, wherein each frequency converter included in each respective light transmitter has a different capacitance, to output different frequencies from the plurality of light transmitters.

2. The visible-light wireless communication system of claim 1, wherein the light source generates white light.

3. The visible-light wireless communication system of claim 2, wherein the frequency converter comprises:

a capacitor for the frequency modulation of the light source.

4. The visible-light wireless communication system of claim 3, wherein a frequency of a light signal to be modulated in the light source is determined by:

$$f_i = \frac{1}{2\pi \sqrt{LC_i}},$$

where $f_i$ is a frequency of a light signal to be generated by the light source, L is an inductance of the light source, and $C_i$ is a capacitance of the light source.

5. The visible-light wireless communication system of claim 2, wherein the light source is a white light emitting diode (LED).

6. A visible-light wireless communication method, comprising:

generating a plurality of light signals modulated in different frequencies using different capacitances; and combining and transmitting the plurality of light signals having different frequencies, wherein the generating of the plurality of light signals comprises outputting light and frequency modulation of the plurality of light signals using different capacitances to output different frequencies.

7. The visible-light wireless communication method of claim 6, wherein the plurality of light signals are modulated to have the different frequencies by using light transmitters with different capacitors.

8. The visible-light wireless communication method of claim 6, wherein a frequency band of a light signal to be modulated in each light transmitter is determined by:

$$f_i = \frac{1}{2\pi \sqrt{LC_i}},$$

where $f_i$ is a frequency of a light signal to be generated by a light source, L is an inductance of the light source, and $C_i$ is a capacitance of the light source.

9. The visible-light wireless communication method of claim 8, wherein light signals modulated at different frequencies are combined by:

$$F(\omega) = \sum_{i=0}^{N} \alpha_i G_i(\omega),$$

where $\alpha_i$ is a compensation coefficient, $F(\omega)$ is a compensated frequency response function, and $G_i(\omega)$ is a gain of the light source.

* * * * *